UNITED STATES PATENT OFFICE.

HERBERT H. DOW, OF MIDLAND, MICHIGAN, ASSIGNOR TO THE DOW CHEMICAL COMPANY, OF MIDLAND, MICHIGAN, A CORPORATION OF MICHIGAN.

PROCESS OF MANUFACTURING BROMIDS.

997,972.

No Drawing.

Specification of Letters Patent. Patented July 18, 1911.

Application filed November 15, 1909. Serial No. 528,183.

*To all whom it may concern:*

Be it known that I, HERBERT H. Dow, a citizen of the United States, and a resident of Midland, county of Midland, and State of Michigan, have invented a new and useful Improvement in Processes of Manufacturing Bromids, of which the following is a specification, the principle of the invention being herein explained and the best mode in which I have contemplated applying that principle, so as to distinguish it from other inventions.

The present improved process, while applicable, as indicated, to the manufacture of bromids in general, has more particular regard to the manufacture of potassium bromid. In other words, the reaction underlying the process can be utilized in the manufacture of other than this particular compound, but in its commercial application the process assumes interest by reason of its being based upon the use of a cheaper potassium salt than has heretofore been available in prevailing processes for manufacturing potassium bromid. As is well known, the material generally used in the manufacture of the bromid of this metal is potassium carbonate, such carbonate being used directly for the absorption of bromid with the resulting production of potassium bromid.

The object of the present invention, already expressed, is the utilization of a less expensive compound than the aforesaid carbonate, as the basis for manufacture, viz. potassium sulfate. In addition to such potassium compound, bromin, lime, and sulfur figure in the several steps of the complete process, which steps will be hereinafter fully described and particularly pointed out in the claims.

The following description sets forth in detail one approved method of carrying out the invention, such disclosed mode, however, constituting but one of various ways in which the principle of the invention may be used.

The several steps involved in carrying on the manufacture of potassium bromid according to such improved method may be briefly recited in their order. Thus, I first take slaked lime and sulfur, and boil the same together for half an hour, more or less, whereby a poly-sulfid of calcium is produced, which is soluble in water. The exact formula for such substance is not known, but it is probable that when prepared in this fashion, it is a mixture of a number of different sulfids of calcium. The reaction for this step may be written as follows:—

$$Ca(OH)_2 + XS \rightarrow CaS_x + CaS_2O_3.$$

The calcium sulfid produced by the foregoing reaction, is then in turn reacted upon by bromin with the production of hydrobromic acid (HBr) and calcium bromid. In this step the bromin may be used either in the liquid or in the vapor state, as most convenient, and if vaporized it may be either pure or mixed with an inert gas, such as air. If it be employed in the latter form, namely, as air laden with bromin, the reaction is most conveniently carried on in an absorption tower of the usual construction, the calcium sulfid liquor being allowed to run over the packing in such tower, while the current of bromin-laden air is passed through such packing in the opposite direction. The reaction for this step may be written as follows:

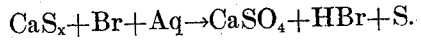
$$CaS_x + Br + Aq \rightarrow CaSO_4 + HBr + S.$$

The solution of calcium bromid produced by the foregoing step will be strongly acid, owing to the presence of the hydrobromic acid. I, accordingly, next neutralize such solution, using to this end lime, either in the form of the hydrate or carbonate, whereby more calcium bromid is produced. It is immaterial whether the lime for thus neutralizing the hydrobromic acid be thus introduced after the brominating step or before. If introduced previously to the brominating, it is preferably mixed with the sulfid liquor, and in such case the acid will be neutralized, with the production of calcium bromid, as fast as it is liberated. Or, instead of adding the lime either before or after the process of brominating, it may be added contemporaneously with such process either continuously or intermittently, as will be readily understood.

If the lime be added after the bromination, the reaction will be as follows—

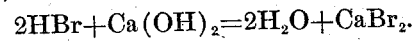
$$2HBr + Ca(OH)_2 = 2H_2O + CaBr_2.$$

If the lime be added before or during bromination, the reaction last given may be combined with that given for the bromination step and may be written as follows:—

The final stage of the general process involves the reaction of the calcium bromid formed by the step or steps just described, with potassium sulfate, thereby forming the desired potassium bromid, and as a by-product, calcium sulfate, or gypsum. The reaction involved is as follows:—

$$K_2SO_4 + CaBr_2 = 2KBr + CaSO_4.$$

The potassium bromid thus formed, being soluble, may be readily separated from the insoluble gypsum by draining or otherwise, such gypsum being washed in order to recover any adhering residue of the bromid. Traces of calcium sulfate may be removed from the bromid liquor by the addition of suitable reagents: for example, add potassium carbonate to precipitate the calcium, as per the reaction—

$$CaSO_4 + K_2CO_3 = CaCO_3 + K_2SO_4.$$

Then add barium bromid to precipitate the sulfur, as per the reaction—

$$K_2SO_4 + BaBr_2 = BaSO_4 + 2KBr.$$

Instead of treating with reagents as above, a more or less satisfactory separation may be obtainable by crystallization only.

Other modes of applying the principle of my invention may be employed instead of the one explained, change being made as regards the process herein disclosed, provided the step or steps stated by any one of the following claims or the equivalent of such stated steps be employed.

I therefore particularly point out and distinctly claim as my invention:—

1. In the manufacture of the bromid of an alkali metal, the steps which consist in brominating calcium sulfid in a water solution and then treating the resulting calcium bromid with the sulfate of the metal in question.

2. In the manufacture of the bromid of an alkali metal, the steps which consist in brominating calcium sulfid in a water solution, neutralizing the hydrobromic acid formed, and then treating the resulting calcium bromid with potassium sulfate.

3. In the manufacture of the bromid of an alkali metal, the steps which consist in brominating calcium sulfid in a water solution, adding lime to neutralize the hydrobromic acid formed, and then treating the resulting calcium bromid with potassium sulfate.

4. In the manufacture of potassium bromid in a water solution, the steps which consist in brominating calcium sulfid, and then treating the resulting calcium bromid with potassium sulfate.

5. The process of manufacturing potassium bromid, which consists in boiling together lime and sulfur, reacting upon the resultant calcium sulfid solution with bromin to produce calcium bromid, and then adding potassium sulfate to a solution of the calcium bromid produced by such reaction.

6. The process of manufacturing potassium bromid, which consists in boiling together lime and sulfur, reacting upon the resulting calcium sulfid solution with bromin to produce calcium bromid, neutralizing the hydrobromic acid thus also formed, and then adding potassium sulfate.

7. The process of manufacturing potassium bromid, which consists in boiling together lime and sulfur, reacting upon the resulting calcium sulfid solution with bromin vapor to produce calcium bromid, neutralizing the hydrobromic acid thus also formed with lime, and then adding potassium sulfate to the calcium bromid solution produced by such reaction and neutralization.

8. The process of manufacturing potassium bromid, which consists in boiling together slaked lime and sulfur, passing the resultant calcium sulfid solution and bromin vapor diluted with an inert gas in opposite directions through an absorption tower, whereby calcium bromid and hydrobromic acid are formed, neutralizing such acid with lime, and then adding potassium sulfate to the calcium bromid solution produced by the preceding reaction and neutralization.

9. The process of manufacturing potassium bromid, which consists in boiling together slaked lime and sulfur, passing the resultant calcium sulfid solution and bromin vapor diluted with air in opposite directions through an absorption tower, whereby calcium bromid and hydrobromic acid are formed, neutralizing such acid with calcium hydrate, and then adding potassium sulfate to the calcium bromid solution produced by the preceding reaction and neutralization.

Signed by me this 12 day of November, 1909.

HERBERT H. DOW.

Attested by—
Thos. Guswold, Jr.,
G. Lee Camp.